Dec. 25, 1962    F. G. LEUTHNER    3,069,734
STERILIZING APPARATUS

Filed Nov. 24, 1958    2 Sheets-Sheet 1

INVENTOR.
FRANK G. LEUTHNER
BY
Attorney

Dec. 25, 1962   F. G. LEUTHNER   3,069,734
STERILIZING APPARATUS
Filed Nov. 24, 1958   2 Sheets-Sheet 2

INVENTOR.
FRANK G. LEUTHNER
BY
Attorney 3,069,734
STERILIZING APPARATUS
Frank G. Leuthner, Gates, N.Y., assignor to Wilmot Castle Company, Brighton, N.Y., a corporation of New York
Filed Nov. 24, 1958, Ser. No. 776,104
6 Claims. (Cl. 21—78)

The present invention relates to apparatus for sterilizing at low temperatures and to a method for transferring sterilized products from a sterilizing chamber into a storage container, and more particularly to the apparatus for transferring a sterilized product from a rotary sterilizing drum to the container in which the product is to be stored and shipped.

Very dense or bulk products, such as flour, powder, and the like can be effectively sterilized in apparatus such as described in my copending application Serial No. 773,674, filed November 13, 1958, by exposure to a gas, such as ethylene oxide, is a sealed chamber which is mounted to rotate during sterilization so that the powdered product is thoroughly subjected to the sterilizing medium. However, when the sterilizing chamber is opened to remove the sterilized product for packaging, storing, or the like, the product comes in contact with the atmosphere with the result that the sterilized product may lose its sterility.

One of the objects of the invention is to provide apparatus and a method for transferring the sterilized product from the sterilizer to a storage container without having the product come in contact with the air.

Another object of this invention is to provide improved sterilizing apparatus for simultaneously sterilizing the storage container and the product in the same operation.

Other objects of this invention will be apparent from the specification, the drawings, and the appended claims.

Figure 1:
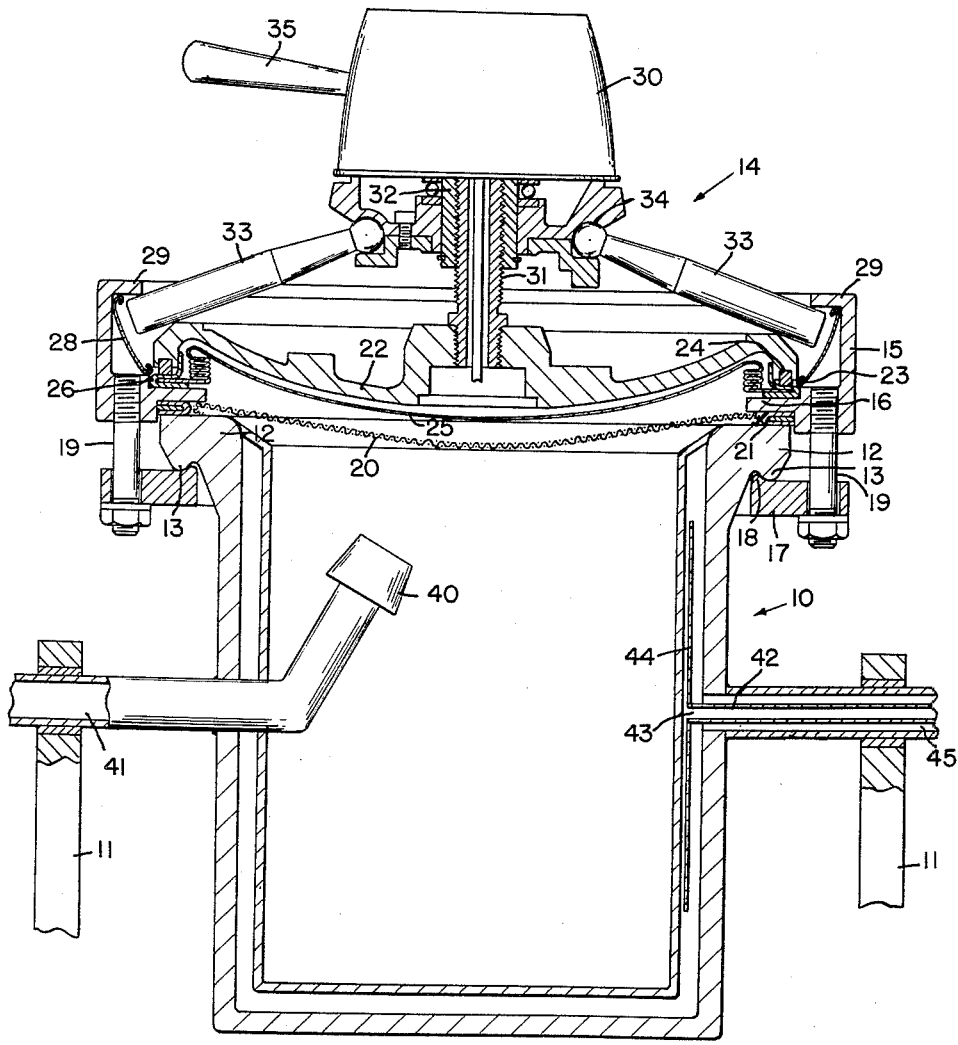
FIG. 1 is a sectional view of a sterilizer, with a bag or flexible container, that is adapted to hold the product being sterilized, positioned therein so that the interior of the bag will be sterilized simultaneously with the product.
Figure 4:
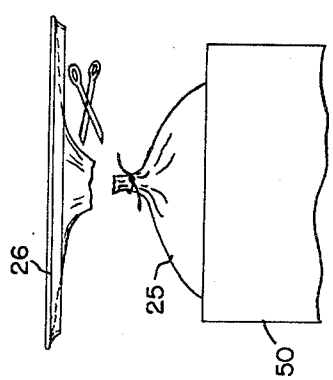
FIG. 4 illustrates the final step of separating the closed flexible container containing the sterilized product from the sterilizer.

The sterilizing apparatus herein comprises a sterilizer which is mounted to rotate, for tumbling the product therein, during the sterilizing cycle. A closure assembly is adapted to be clamped to the sterilizer for enclosing the sterilizing chamber and sealing the product therein. Interposed between the closure assembly and the edge of the sterilizer is a flexible bag or container which completely encloses the open end of the sterilizer, and which is collapsed against the closure during the sterilizing cycle. Also interposed between the closure assembly and the sterilizer is a screen or baffle plate which covers the opening of the sterilizing chamber below the collapsible bag. The sterilizer is provided with means for holding the collapsible bag in sealing relationship with the top of the chamber opening when the closure assembly is removed, and the sterilizer is inverted. The inverting of the sterilizer with the closure removed causes the bag to unfold by gravity and the sterilized products then fall through the screen or baffle plate into the attached bag. The bag is then sealed shut while still attached to the inverted sterilizer, and then severed from the sterilizer above its seal. The portion of the bag still fastened to the sterilizer can then be removed and another bag inserted in its place for a subsequent sterilizing cycle.

Referring now to the drawings by numerals of reference, 10 denotes a sterilizing drum, which is rotatably mounted on supporting members 11, and is adapted to contain the product to be sterilized. The sterilizer 10 has an open end which is surrounded by an end flange 12, which flange is formed with a lip 13. A closure retaining ring 15 having a radially extending flange 16 is adapted to be supported by the flange 12. Disposed below the flange 16 and surrounding the chamber 10 is a ring-shaped clamping member 17 which has an annular lip 18 around its central opening. The members 16 and 17 are drawn together to clamp them to the flange 12 of the sterilizer by the bolts 19.

Interposed between the flange 16 and the flange 12 is a diffusing screen or baffle plate 20 which completely covers the opening of the sterilizer 10. The screen is surrounded by an annular sealing gasket 21 which is interposed between the flange 12 and the flange 16 of the retaining ring 15.

A flexible container or bag 25, which is adapted to hold the sterilized product, and which has a gasket 26 heat sealed around its opening, is placed over the opening of the sterilizer 10 over the flange 16. The container 25 is an air-tight flexible plastic bag, of polyethylene, or its equivalent. The gasket 26 which is attached around the opening of the bag 25, is preferably a preformed gasket being approximately one inch wide by three sixteenths of an inch thick, for example. An annular resilient clamp 28 is adapted to be removably compressed against the gasket 26 to hold the gasket and the attached bag 25 in position when the cover 22 is removed. This clamp is interposed between a flange 29 of the clamping ring 15 and the gasket 26. In the position shown in FIG. 1, the walls and bottom of the container 25 are collapsed. The interior of the container 25 is in communication with the interior of the chamber 10 during the sterilizing process.

The closure comprising a cover 22 having a peripheral edge 23 is adapted to engage the surface of the gasket 26. A sealing ring 24 in the edge 23 provides a pressure seal between the surface 16 and the cover 22 with the gasket 26 therebetween.

The flexible container 25 and the cover 22 are clamped to the sterilizer 10 to seal the interior of the sterilizer by a closure 30. The closure 30 which comprises the cover member 22 and a threaded member 31, is secured to the center of the cover. The closure is held in place by conventional rotatable clamping means comprising a sleeve 32 which is threaded to the member 31, and has outwardly extending clamping arms 33 which are movable in sockets 34 formed in a portion of the member 32. The outer ends of the arms 33 are adapted to fit between the flange 29 of the retaining ring 15 and the edge of the cover 22. A lever 35 is provided to thread the member 32 in either direction to either spread the arms 33 to clamp the cover 22 in sealing position, or to collapse the arms 33 thereby withdrawing them out of clamping engagement from the flanged edge 29 to remove the cover 22.

In operation, the product to be sterilized is deposited in bulk in the interior of the sterilizer 10. The screen 20 is inserted over the top of the opening and securely clamped thereto by means of the retaining ring 15 and the clamp 17. The gasket 26 with the flexible container 25 attached thereto is then positioned on the upper surface of the radially extending flange 16. The bottom and the walls of the flexible container 25 are collapsed to rest above the screen 20. The cover 22 is then secured in place so that its sealing gasket 24 rests on the gasket 26 of the container 25. After the container 25 has been properly positioned, the annular clamp 28 is inserted against the gasket 26, and its upper end is pushed into engagement with the underside of the flange 29. The clamping arms 33 are then inserted between the edge of the cover 22 and the underside of the flange 29; and the lever 35 is rotated to thread the block 32 downward on the vertical rod 31 thereby clamping the cover 22 securely to the sterilizer 10 with the flexible container 25 interposed therebetween.

The product in the chamber is now ready to undergo the sterilization process and the sterilizer 10 is rotated on the supports 11. One successful method of sterilizing such products comprises removing the air from the rotating chamber 10 through a conventional filter 40 and a conduit 41 by means of a pump (not shown). After the air has been evacuated from the chamber 10, the interior of the chamber 10 is humidified by introducing moisture through the conduit 41, after which a sterilizing gas such as an ethylene oxide and carbon dioxide mixture is introduced through the conduit 41 into the rotating chamber until it attains a pressure of approximately thirty pounds per square inch for example. The chamber 10 is rotated continually, during which time both the product and the interior of the container 25 are thoroughly exposed to the sterilizing gas. A hollow duct 42 provides for the introduction of steam into a jacket 43 which is divided by a baffle 44 so that the steam exhausts through a conduit 45, for keeping the sterilized products at the proper temperature. The screen 20 prevents the tumbling products in the chamber 10 from forcefully hitting the surface of the bag 25 during rotation, prevents the vacuum in the chamber from drawing the flexible portion of the container 25 into the chamber when the air or gas is removed therefrom, and prevents rupture of the bag 25 when unloading by diffusing and restricting the flow of the sterilized products.

After the products have been sterilized, the gas is removed through the filter 40 and the conduit 41 until a vacuum of approximately twenty-seven inches of mercury is attained in the chamber 10; filtered and purified air is then introduced through the conduit 41 into the sterilizer 10, and the motor (not shown) is shut off to stop the rotation of the chamber 10.

Figure 3:
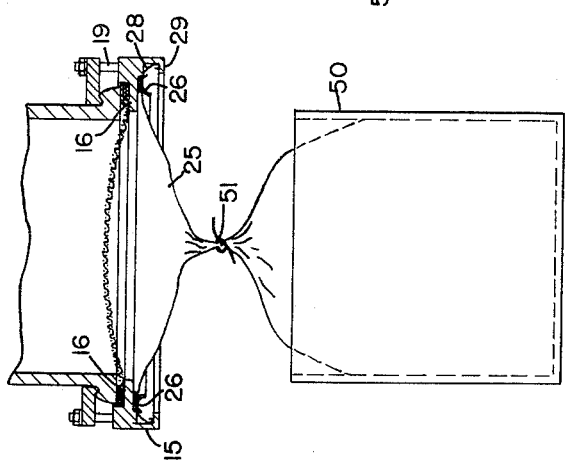
FIG. 3 illustrates the step of sealing the flexible container with the sterilized product contained therein.
Figure 2:
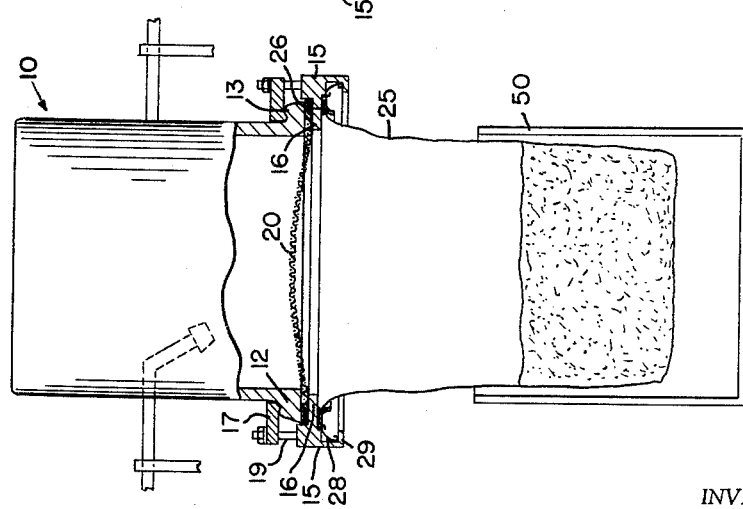
FIG. 2 illustrates diagrammatically the position of the sterilizer and the flexible bag when transferring the sterile product from the sterilizing chamber into the bag.

The lever 35 is then rotated to disengage the arms 33 from clamping engagement with the retaining ring 15; and the cover 22 is removed. The sterilizer 10 is then inverted. The flexible container 25 is then permitted to unfold by gravity. It may be guided into a more rigid container 50 for storing and shipping if desired. The gasket 26 is still maintained in sealing engagement with the sterilizer 10 against the surface of the flange 16 by the retaining clamp 28. In the inverted position, the sterilized material from the sterilizer 10 is diffused through the screen 20 and sifts into the bag 25 in the position shown in FIG. 3. When the sterilized product is completely removed from the sterilizer 10, the neck of the flexible container 25 is securely closed by tieing with a cord 51 and then heat sealing the container shut in the vicinity of the seal. After the container has been securely sealed the flexible container is cut above the sealed joint thereby separating the container 25 from the chamber 10. The resilient clamping member 28 is then removed from the blender and the gasket containing the cut portion of the flexible container 25 is removed. It is apparent that it is unnecessary to remove the screen or baffle plate 20 during successive sterilizing cycles if the particles of the product to be sterilized readily sift through the screen.

Thus, it is seen that I have provided an improved apparatus and method wherein sterilized products can be transferred from a sterilizer to a storage container without coming in contact wtih non-sterile air, so that the product can be stored for an indefinite length of time without losing its sterility.

Although this embodiment of the invention is concerned with the transferring of pulverized and densely packed products from a rotatable sterilizer into a flexible container, it is understood that this apparatus and method may be used for sterilizing and transferring any type of sterilized apparatus or articles from a sterilizing chamber to a storage container.

While the invention has been described in connection with a specific embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

Having thus described my invention, what I claim is:

1. A sterilizing apparatus, comprising a sterilizing chamber, said apparatus having an opening communicating with said chamber for insertion and removal of the material which is to be sterilized, means for securing an open-ended flexible container to said apparatus over said opening with the open end of said flexible container communicating with said chamber, and means permitting substantially simultaneous sterilization of both said chamber and said open-ended flexible container.

2. A sterilizing apparatus, comprising a sterilizing chamber, said apparatus having an opening communicating with said chamber for insertion and removal of the material which is to be sterilized, means for sealing a removable cover to said sterilizing chamber over said opening, and means for securing an open-ended flexible container to said apparatus over said opening with the open end of said flexible container communicating with said chamber.

3. A sterilizing apparatus, comprising a sterilizing chamber, said apparatus having an opening communicating with said chamber for insertion and removal of the material which is to be sterilized, means for sealing a removable cover to said sterilizing chamber over said opening, means for securing a screen over said opening and means for securing an open-ended flexible container to said apparatus over said opening between said screen and cover with the open end of said flexible container communicating with said chamber.

4. A sterilizing apparatus, comprising a sterilizing chamber, said apparatus having an opening communicating with said chamber for insertion and removal of the material which is to be sterilized, means for sealing a removable cover to said sterilizing chamber over said opening, and means for securing an open-ended flexible container to said apparatus over said opening, said container having sealing means attached to the periphery of said open end, said sealing means being interposed between the cover and the opening of the apparatus with the open end of said flexible container communicating with said chamber.

5. Apparatus according to claim 4 having means for securing a screen over the opening of said apparatus below the flexible container.

6. Sterilizing apparatus comprising a sterilizing chamber, said apparatus having an opening communicating with said chamber for insertion and removal of material which is to be sterilized, means for sealing a removable cover to said sterilizing chamber over said opening, means for sealing an open-ended flexible container to said apparatus over said opening with the open end of said flexible container communicating with said chamber, and means for inverting said apparatus.

References Cited in the file of this patent

UNITED STATES PATENTS

| | | |
|---|---|---|
| 2,255,975 | Hultkrana | Sept. 16, 1941 |
| 2,263,691 | Enkur | Nov. 25, 1941 |
| 2,289,668 | Mallory | July 14, 1942 |
| 2,490,344 | Fisher | Dec. 6, 1949 |
| 2,537,530 | Hofman | Jan. 9, 1951 |
| 2,918,770 | Stocker | Dec. 29, 1959 |